Feb. 18, 1969     J. D. TUTHILL ET AL     3,428,471
METHOD FOR THE MANUFACTURE OF EMBOSSED VINYL FLOOR
COVERINGS AND PRODUCTS OBTAINED THEREBY
Filed Nov. 8, 1967
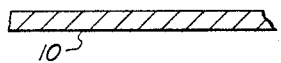
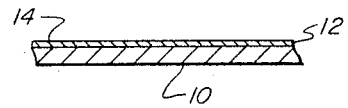
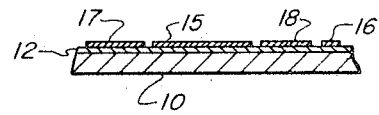
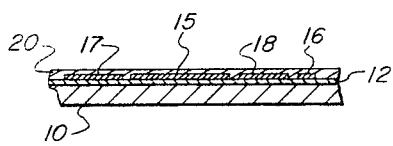
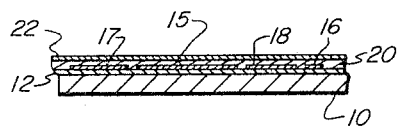
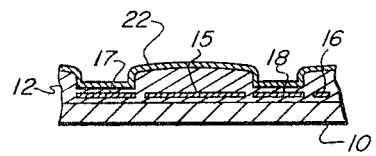
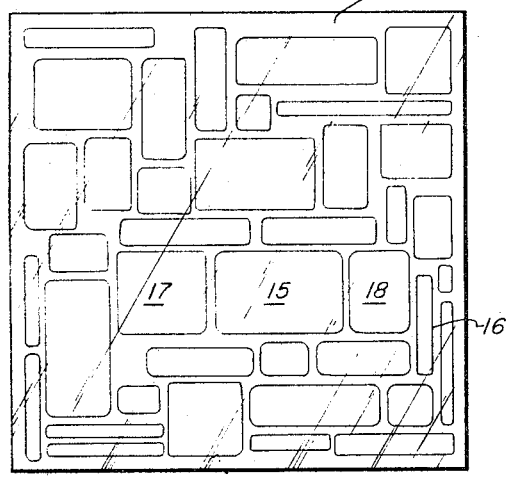
INVENTORS:
JAY D. TUTHILL
NICHOLAS KULKA
BY   BERT S. ARBAN
ATTORNEYS United States Patent Office 3,428,471
Patented Feb. 18, 1969

3,428,471
METHOD FOR THE MANUFACTURE OF EMBOSSED VINYL FLOOR COVERINGS AND PRODUCTS OBTAINED THEREBY
Jay D. Tuthill, Salem, Nicholas Kulka, Penns Grove, and Bert S. Arban, Woodstown, N.J., assignors to Mannington Mills, Salem, N.J., a corporation of New Jersey
Filed Nov. 8, 1967, Ser. No. 681,461
U.S. Cl. 117—10   9 Claims
Int. Cl. B44c 1/22

ABSTRACT OF THE DISCLOSURE

A layer of a foamable vinyl plastisol composition containing a blowing agent uniformly dispersed therein is applied to a felt backing and pre-gelled by heating at a temperature below that at which the blowing agent is decomposed. A decorative pattern is printed on the surface of the gelled vinyl layer by applying a barrier and preferably other inks thereto, and the entire surface, including the area covered by the barrier ink is coated with a second layer of a vinyl composition containing an activator for the blowing agent. After the activator has penetrated into portions of the foamable vinyl composition, a wear layer is applied. The composite is then heated under controlled conditions of time and temperature to fuse the resinous layers and decompose the blowing agent throughout those areas not covered by the barrier ink thereby producing an embossed resinous surface wherein those areas of the surface that have not had applied thereto the barrier ink are elevated above those areas that have been coated with the barrier ink.

BACKGROUND OF THE INVENTION

This invention relates to a method for manufacturing floor coverings and more specifically to the production of structures having a backing material that is generally fibrous in nature, fused to a cellular resinous composition, the surface of which is embossed.

Embossed vinyl floor coverings are constructed of an indent resistant backing material generally referred to as felt, which may be organic or inorganic and comprises, for example, rag, wood fiber, kraft paper, asbestos and similar fibrous substances saturated with a synthetic rubber latex.

It is common practice to coat both sides of the backing material with a resinous composition. The face of the felt, for example may be treated with a polyvinyl acetate coating composition and/or an acrylic coating composition. The purpose of this face coating is to lay the fibers, level the sheet for subsequent application of vinyl layers, prevent migration of the plasticizer from the vinyl layers into the felt, thereby reducing the possibility of delamination, and seal off organic dyes that may be present in the rag stock from which the felt is derived. A resinous coating is also applied to the back side of the organic felt to seal any fibers that might possibly loosen, while passing over the rolls during processing. Such free fibers can accumulate to form fiber lumps that will transfer to the face of the sheet during processing roll wind-ups. This can be prevented by applying a backing coat of a solution of a cellulose gum, e.g. carboxy methyl cellulose.

The face of the material is next coated with a foamable plastisol containing a glowing agent which decomposes at elevated temperatures to produce a cellular resinous layer that is fused to the backing material. Such products have excellent resilience because of the cellular structure of the resinous layer, and are usually printed with a surface design, which may be protected by a transparent wear layer.

In accordance with known practice, the resinous layer may be mechanically embossed by heating until it is softened and applying pressure to the surface of the resin by contact with an engraved plate or embossing roll. Engraved embossing rolls and plates are expensive to produce, however, and considerable care is required in practice to achieve perfect registration of the embossing and the design. It is not surprising, therefore, that many methods have been suggested for producing cellular foam sheets having an embossed surface without utilizing embossing rolls.

One method which does not require embossing rolls is disclosed in U.S. Patent No. 2,964,799, which issued to P. E. Roggi et al. on Dec. 20, 1960. In accordance with this patent, a foamable resinous composition is formed into a self-supporting sheet and heat is applied at specific points to cause the blowing agent at those points to decompose and form a cellular structure. The raised areas in the finished sheet correspond to the points of heat application.

Another embossing procedure applicable to foamable compositions is disclosed in U.S. Patent No. 3,293,094, which issued to R. Frank Nairn et al. on Dec. 20, 1966. In accordance with the teaching of this patent, a resinous cellular layer is produced, with portions thereof contrasting in thickness with the remaining part of the layer by incorporating a blowing agent in the resinous composition and applying to certain portions of the surface thereof an inhibitor that is capable of penetrating into the resinous layer and substantially altering the temperature at which the blowing agent in said portions decomposes. The resinous layer is subsequently uniformly heated to produce the desired contrast in thickness.

SUMMARY OF THE INVENTION

In accordance with the invention, it has been discovered that one may manufacture an embossed cellular resinous sheet by appying to the surface of a gelled foamable resinous layer having a blowing agent uniformly distributed therethrough, a barrier ink, and preferably other inks, to form a decorative pattern thereon. The entire printed surface of the resinous layer including the barrier ink is then overcoated with a second layer containing an activator for the blowing agent. After aging this product for a suitable period, e.g. 48 hours, a wear layer is applied and the product is heated under controlled conditions of time and temperature to fuse the resinous layers and decompose the blowing agent throughout those areas not covered by the barrier ink, thereby producing an embossed resinous surface wherein those areas of the surface that have not had applied thereto the barrier ink are elevated with respect to other areas of the resinous surface that have been coated with the barrier ink. This discovery makes possible the manufacture of sheets of embossed cellular resin supported by a fibrous backing material having utility as floor coverings.

The foamable resinous layer is preferably a vinyl plastisol composition, having a blowing agent distributed throughout its thickness. This layer can be applied to a coated backing felt with a reverse roll coater or a trailing doctor blade coater. The wet foamable plastisol is heated to pre-gel the layer so that it will have sufficient strength to withstand subsequent wind-up and printing operation.

The preferred blowing agent is azodicarbonamide which is particularly useful in the process to be described because of its decomposition temperature, gas yield, and lack of toxicity. Azodicarbonamide upon decomposition yields gases, and the residue consists of stable organic compounds that have no adverse effect on the product. Other blowing agents may be used if desired. Examples of such agents are: p,p'-oxybis (benzene sulfonyl hydrazide); p,p'-oxybis (benzene sulfonyl semicarbazide); azobisisobutyronitrile, N,N'-dimethyl-N,N'-dinitrosoterephthalamide and diazoaminobenzene.

The barrier ink used in printing the decorative design or pattern on the resin surface is prepared from an ink extender that contains a polyvinyl chloride copolymer resin and a methyl methacrylate resin dissolved in a solvent. To the ink extender is added concentrated shading colors to give the desired pattern shade and from 10 to 12 percent of trimellitic anhydride. Other materials which have been found to act as barriers and may be substituted for the trimellitic anhydride are:

Organic acids such as salicylic acid, dl-maleic acid, glycolic acid, lactic acid, fummaric acid and p-toluene sulfonic acid; organic esters such as butyl acid phosphate, benzylthioglycolate; organotin compounds such as dibutyl tin mercaptopropionate, dibutyl tin bis-(laurylmercaptide) and alkyl tin mercaptide; barium soaps such as barium myristate, barium octoate; acid anhydrides such as maleic anhydride; and organic amides such as 1-cyanoguanidine. Another interesting compound that will act as a barrier is boron trifluoride.

While the present invention is not to be limited by theoretical considerations, it is believed that the barrier ink forms a physical or chemical barrier which effectively prevents the activator present in the activator layer from contacting the blowing agent present in the foamable plastisol gel and altering the temperature at which the blowing agent decomposes.

The activator layer that is applied over the foamable resinous layer and barrier ink is a solution of a methyl methacrylate resin and an activator for the blowing agent. Zinc octoate and cadmium octoate are particularly preferred activators, and dibasic lead phosphate is also a suitable activator for the blowing agent. The activator is permitted to penetrate into those portions of the gelled foamable resinous layer that have not been printed with a barrier ink.

A resinous wear layers is then applied and the composite structure is heated under controlled conditions of time and temperature to fuse the resinous layers and decompose the blowing agent throughout those areas not covered by the barrier ink, thereby producing an embossed resinous surface wherein those areas of the surface that have not had applied thereto the barrier ink are elevated above those areas that have been coated with the barrier ink.

BRIEF DESCRIPTION OF THE DRAWING

The invention will be better understood from the following description and examples when read in connection with the drawings wherein:

FIGURES 1 to 5 are enlarged cross-sectional views of a felt-resin sheet in various stages of manufacture, the relative thickness of the various layers are not in proportion;

FIGURE 6 is an enlarged cross-sectional view of a felt-resin sheet after decomposition of the blowing agent showing depressions throughout those areas coated with barrier ink. Again for illustrative purposes, the various layers are not in proportions and FIGURE 7 is a plan view of the finished product of FIGURE 6.

Throughout the examples that follow all quantities are expressed in parts by weight unless otherwise indicated.

DESCRIPTION OF THE PREFERRED EMBODIMENTS

Example 1

In accordance with one embodiment of the invention, a fabric-vinyl resin sheet having an embossed decorative surface is produced. An indent resistant backing material, 38 mils in thickness, generally known in the trade as "organic felt" is coated with a first face coat consisting of a polyvinyl acetate composition having a viscosity of 400 to 600 centipoises. The coating thickness is 3½ wet mils and the coating is dried in a conventional heat oven at about 250° F. to 310° F. A second face coating consisting of an acrylic composition having a viscosity of 400 to 600 centipoises is applied at a wet thickness of 2½ wet mils and this second coating is oven dried at 250° F. to 320° F. A solution of carboxymethyl cellulose, viscosity 500–600 centipoises is then applied to the back of the felt as a wash coat and the felt is again dried at 300° F. The felt, identified in FIGURES 1 through 6 by the numeral 10 is then in proper condition for application of the foamable plastisol layer. The foamable plastisol has the following composition:

| | Parts |
|---|---|
| Medium molecular weight polyvinyl chloride resin, dispersion grade, specific viscosity 0.6 | 1000 |
| High molecular weight polyvinyl chloride resin, dispersion grade, specific viscosity 0.4 | 1000 |
| Low molecular weight polyvinyl chloride resin, suspension grade, specific viscosity 0.34 | 500 |
| Plasticizer-alkyl aryl phthalate ester and alkyl aryl hydrocarbon (Santicizer 213, Monsanto Chemical Co.) | 1200 |
| Polyethylene glycol monolaurate | 25 |
| Azodicarbonamide (50% dispersion in dioctyl phthalate) | 130 |
| Titanium dioxide (55% dispersion in Santicizer 213) | 400 |

The foamable plastisol composition is applied to the coated face of the backing felt with a reverse roll coater at a thickness of 12 wet mils and pre-gelled in a gas fired convection oven with top and bottom heat.

The oven is 60 feet in length with two 30 foot zones. Zone 1 is maintained at a temperature of 220° F. to 250° F. and zone 2 is maintained at a temperature of 230° F. to 260° F. The coated backing felt passes through the oven at a speed of 75 to 85 feet per minute and the exit temperature on the face of the pre-gel is 175°–185° F. The heating converts the wet foamable plastisol to a pre-gelled foamable plastisol.

The degree to which the sheet is pre-gelled is an important step in the manufacture of this product as the sheet must have sufficient strength to withstand the subsequent wind-up operations and still be sufficiently soft to enable the subsequently applied activator layer to penetrate into the foamable plastisol layer. Good penetration will result in a high ratio of foam thickness to original pre-gel thickness and also give an even size cell distribution from the foam/felt interface to the foam/clear interface. Experience has demonstrated that the foamable plastisol layer is properly pre-gelled when the vinyl plastisol layer has a tensile strength of between 150 and 250 pounds per square inch and an elongation of 30% to 50% at the breaking point. The pre-gelled foamable plastisol layer is identified in FIGURES 2 through 6 by the numeral 12.

The surface 14 of the pre-gelled sheet 12 is printed with a five station rotogravure printing press capable of printing four different colors plus a knurl (over all coverage) application of colorless activator ink. The first four stations of the printing press apply the printed design of the pattern. As shown in FIGURE 3, which illustrates the printed pattern of the present example, a barrier ink is applied to the surface 14 over the areas 17 and 18, and a colored ink (containing no barrier) is applied over the areas 15 and 16.

The fifth station of the rotogravure printing press applies the colorless activator ink 20 completely covering all previously applied inks making up the pattern design including the barrier inks 17 and 18. FIGURE 4 is a cross-sectional view of the printed stock after the colorless activator ink 20 has been applied over the printed pattern.

The barrier ink that is applied over the areas 17 and 18 has the following formulation:

| | Parts |
|---|---|
| Diacetone alcohol | 198 |
| 2-nitropropane | 990 |
| Isopropyl acetate | 462 |
| Polyvinyl chloride copolymer[1] (VAGH, Union Carbide, New York, N.Y.) | 350 |
| Methyl methacrylate resin (30% solution in Cellosolve acetate) | 500 |
| Trimellitic anhydride | 60 |

In mixing the barrier ink, the trimellitic anhydride is dissolved in a portion of the diacetone alcohol and stirred into the solution of vinyl chloride and methyl methacrylate resins. The barrier ink is colored to give the desired pattern shade by adding 100 parts of chrome yellow pigment dispersed in 400 parts of a 30% solution of polyvinyl chloride (VAGH) and methyl methacrylate resin (weight ratio 2.3:1).

The colored ink that is applied to the surface 14 over the areas 15 and 16, contains no barrier. It has the following composition:

| | Parts |
|---|---|
| Diacetone alcohol | 198 |
| 2-nitropropane | 990 |
| Isopropyl acetate | 462 |
| Polyvinyl chloride copolymer (VAGH) | 350 |
| Methyl methacrylate resin (30% solution in Cellosolve acetate) | 500 |

This ink is shaded to the desired color with a pigment dispersion having the following formulation:

| | Parts |
|---|---|
| Pigment color | 100 |
| Diacetone alcohol | 32 |
| 2-nitro propane | 158 |
| Isopropyl acetate | 74 |
| Polyvinyl chloride copolymer (VAGH) | 56 |
| Methyl methacrylate resin (30% solution in Cellosolve acetate) | 80 |

The activator ink is a clear ink and completely covers the printed pattern including those printed areas colored with a barrier ink. The activator ink has the following composition:

| | Parts |
|---|---|
| Diacetone alcohol | 28.5 |
| 2-nitropropane | 142.0 |
| Isopropyl acetate | 66.5 |
| Methyl methacrylate (Acryloid A-11) | 55 |
| Zinc octoate (a 15% solution in di-2-ethyl hexyl phthalate sold by The National Polychemicals Co. as XR-21) | 50 |

[1] A copolymer of 91 parts vinyl chloride and 9 parts vinyl acetate.

After the activator ink has been applied the printed stock is wound into rolls and aged for 48 hours to permit the activator to penetrate into portions of the foamable vinyl layer 12. A clear plastisol wear layer 22 is then applied over the activator layer 20 as shown in FIGURE 5. The formulation for the wear layer is:

| | Parts |
|---|---|
| Medium molecular weight polyvinyl chloride resin (specific viscosity 0.5) | 2840 |
| Santicizer 213 | 1425 |
| Zinc naphthenate (2½ percent by weight in xylene) | 142 |
| Mineral spirits | 190 |

The wear layer is applied with a reverse roll coater (7 mils wet thickness) and the wet sheets are passed through an electric radiant heat oven to solidify the wear layer and remove any residual solvent from the printing operation.

The product illustrated in FIGURE 5 is next fused and foamed by passage through a gas fired convection hot air oven that is 100 feet in length. The oven has three separate sections and each section is heated at the top and bottom. The first zone, thirty feet in length is maintained at 340° F. The second zone, also 30 feet in length is maintained at 365° F., and the third zone 40 feet in length is heated to 385° F. The resin-felt structure is passed through this oven at the rate of 27 feet per minute, the exit temperature of the foamed resinous coating being in the range of 310° F. to 330° F.

At the end of the fusing and foaming oven are two cooling chambers each 30 feet in length. One of these chambers is cooled with ambient air and the other with refrigerated air. It is important to reduce the temperature of the foamed resinous layer sufficiently to assure that the cellular layer will not collapse or be distorted when the face of the sheet touches a roll.

Immediately after cooling the resinous coated felt will have the embossed structure shown in FIGURE 6. It will be noted that portions of the resinous layer are elevated above other portions of the resinous layer that have been coated with the barrier ink.

Water is added to the backing felt for dimensional stability and the material is wound into rolls and stored to allow the water to come to equilibrium throughout the backing felt. The rolls are then ready for trimming, inspection and wrapping.

The product so obtained has an embossed surface that results from depressions 18 to 20 mils in depth in registration with those areas printed with the barrier ink. The design printed on the surface of the resinous composition is clearly visible through the transparent wear layer, and the surface exhibits excellent resistance to wear and staining.

The product shows instantaneous recovery from spike heel shoes. Utilizing an Armstrong indent tester with a ¾ inch diameter dome of silence type pin with 100 pounds of dead load for 60 seconds dwell, 90–95% recovery occurs within 1 minute and 96–98% recovery within 10 minutes. A long term indent test utilizing a ¼ inch diameter foot with 1000 gram weight for seven days dwell shows 93 to 97% recovery in 24 hours.

Example II

The process described in Example I above is repeated substituting for the twelve percent by weight trimellitic anhydride in the barrier ink the chemicals identified in Table I below. In every instance, heating the resinous felt composite under controlled conditions to selectively decompose the blowing agent produces an embossed resinous surface wherein those areas of the surface that have not had applied thereto a barrier ink are elevated above those areas that have been coated with a barrier ink.

TABLE I

| Company | Compound | Percent in Ink | Pre-Gel, Mils | (Mils) Barrier Area After Blow | (Mils) Activated Area After Blow |
|---|---|---|---|---|---|
| Amoco | Trimellitic Anhydride | 7 | 12 | 14 | 25 |
|  | Butyl Acid Phosphate | 7 | 12 | 17 | 29 |
| Chevron | Fumaric Acid | 7 | 12 | 17 | 28 |
|  | Terephthaloyl Chloride | 7 | 12 | 22 | 30 |
|  | Salicylic Acid | 7 | 12 | 25 | 30 |
|  | Benzylthioglycolate | 7 | 12 | 24 | 30 |
| Chevron | Maleic Anhydride | 7 | 12 | 24 | 30 |
|  | Boron Fluoride | 7 | 14 | 20 | 27 |
|  | Butyl Acid Phosphate | 7 | 14 | 17 | 28 |
|  | Toluene Sulfonic Acid | 7 | 13 | 22 | 28 |
|  | Boron Trifluoride | 7 | 13 | 19 | 29 |
| Amoco | Trimellitic Anhydride | 10 | 12.5 | 22 | 32 |
|  | Salicylic Acid | 15 | 13 | 21 | 26 |
|  | dl-Maleic Acid | 15 | 13 | 17 | 26 |
|  | Glycolic Acid | 15 | 13 | 19 | 26 |
|  | Lactic Acid | 15 | 13 | 17 | 27 |
|  | Maleic Anhydride | 15 | 13 | 17 | 20 |
|  | Cyanoguanidine | 15 | 13 | 14 | 27 |
| Amoco | Trimellitic Anhydride | 15 | 13 | 15 | 27 |
|  | Benzylthioglycolate | 15 | 13 | 25 | 27 |
|  | Benzylthioglycolate, 7% and Trimellitic Anhydride, 7% | [1] 14 | 13 | 16 | 28 |
| Metal & Thermit | Thermolite 42 (Organotin) | 15 | 13 | 32 | 34 |
| Do | Thermolite 31 (Organotin) | 15 | 13 | 26 | 35 |
| Do | Thermolite 15 (Organotin) | 15 | 13 | 34 | 38 |
| Do | Thermolite 13 (Organotin) | 15 | 13 | 30 | 38 |
|  | Stannous Chloride | 15 | 13 | 20 | 39 |
|  | Fumeric Acid | 15 | 13 | 19 | 30 |
| Ferro | Fe 170 (Barium soap liquid) | 20 | 13.5 | 22 | 35 |
| Do | Fe 182 (barium myristate solid 35% in Santicizer-213) | 20 | 13.5 | 30 | 35 |

[1] Total.

Example III

The process described in Example I above is repeated substituting for the 13.6% by weight zinc octoate present in the activator layer the chemicals identified in Table II below. In every instance, heating the resinous felt structure under controlled conditions to selectively decompose the blowing agent produced an embossed resinous surface wherein those areas of the surface that have not had applied thereto a barrier ink are elevated above those areas that have been coated with a barrier ink.

TABLE II

| Company | Composition | Present in Composition | Percent Composition in Ink | Pre-Gel, Mils | (Mils) Barrier Area After Blow | (Mils) Activated Area After Blow |
|---|---|---|---|---|---|---|
| National Polychemicals | XR-21 | Zinc Octoate | 10 | 12 | 16 | 28 |
| Ferro Corp | Fe-700 | do | 12.5 | 12 | 13 | 24 |
| Do | Fe-200 | Cadmium (14% Octoate metal) | 12.5 | 12 | 16 | 25 |
| Do | Fe-840 | Tin Mercaptide | 12.5 | 12 | 15 | 21 |
| Do | Fe-5019 | Zinc octoate, 16% Zinc | 12.5 | 12 | 18 | 32 |
| Do | Fe-5373 | Zinc (6%) Lead (8%) | 12.5 | 12 | 17 | 30 |
| Advance | ABC-1 | Zinc compound with Modifiers (no Lead or Cadmium) | 12.5 | 12 | 18 | 31 |
| Nuodex | V-1451 | Lead compound liquid | 12.5 | 12 | 20 | 35 |
| National Lead | Dyphos | Dibasic Lead Phosphite 70% in Dioctyl Phthalate | 12.5 | 12 | 20 | 30 |

What is claimed is:

1. A process for the manufacture of an embossed wear resistant decorative sheet of resinous composition comprising: applying a first resinous composition containing a blowing agent, but essentially no activator therefor, to the entire surface of a sheet of backing material; pre-gelling said first resinous composition by heating at a temperature below that required to decompose the blowing agent for a time that will result in a gel strength sufficient to withstand subsequent wind-up operations; applying to portions of the surface of said first resinous composition a barrier ink; coating the entire surface of the pre-gelled resinous composition and the barrier ink with a thin layer of a second resinous composition containing an activator for said blowing agent; permitting the activator to penetrate substantially all portions of said first resinous composition except those covered by said barrier ink; applying a wear layer over the entire surface of the second resinous composition; solidifying the wear layer; and, uniformly heating the product so obtained under controlled conditions of time and temperature to fuse and foam the product, thereby producing an expanded cellular layer wherein those areas of the surface that have not had the barrier ink applied thereto are elevated above those areas that have been coated with the barrier ink, all of the foregoing resinous compositions and the ink being fluid when applied.

2. The process of claim 1, wherein said first resinous composition comprises a polymer of vinyl chloride.

3. The process of claim 1 wherein said blowing agent is azodicarbonamide.

4. The process of claim 1 wherein said activator is zinc octoate.

5. The process of claim 1 wherein the barrier ink contains trimellitic anhydride.

6. An article of resinous composition capable, by the application of heat, of forming an embossed resinous layer having first portions of a thickness greater than the thickness of second portions thereof, when passed at the rate of 27 feet per minute, through a 100 foot oven with an inlet temperature of 340° F., a central portion having a temperature of 365° F., and a final portion having a temperature of 385° F., comprising a first resinous composition layer containing a blowing agent but essentially no activator therefor uniformly dispersed throughout the layer; a barrier ink covering portions of said first resinous layer to form a pattern, a second resinous layer containing an effective amount of an activator for said blowing agent extending over said first resinous layer and barrier ink layer; and a resinous surface wear layer extending over said second resinous layer, said resinous composition being fused to and supported by a backing material.

7. The product of claim 6, wherein said blowing agent is azodicarbonamide.

8. The product of claim 6, wherein said barrier ink contains trimellitic anhydride.

9. The product of claim 6, wherein the activator in said second resinous layer is zinc octoate.

References Cited

UNITED STATES PATENTS

| 2,918,702 | 12/1959 | Wetterau. |
| 2,920,977 | 1/1960 | Adams. |
| 3,244,894 | 12/1965 | Palmer. |
| 3,257,252 | 6/1966 | Keel. |
| 3,293,094 | 12/1966 | Nairn et al. |
| 3,365,353 | 1/1968 | Whitman. |
| 3,239,365 | 3/1966 | Petry _____ 117—11 |
| 3,293,108 | 12/1966 | Nairn et al. _____ 161—160 |

DAVID KLEIN, *Primary Examiner.*

U.S. Cl. X.R.

156—79; 264—47, 52, 54; 161—119, 161

Notice of Adverse Decisions in Interferences

In Interference No. 96,844 involving Patent No. 3,428,471, N. Kulka and B. S. Arban, METHOD FOR THE MANUFACTURE OF EMBOSSED VINYL FLOOR COVERINGS AND PRODUCTS OBTAINED THEREBY, final judgment adverse to the patentees was rendered Dec. 15, 1972, as to claims 1–4, 6, 7 and 9.

[*Official Gazette May 22, 1973.*]